Figure 1:
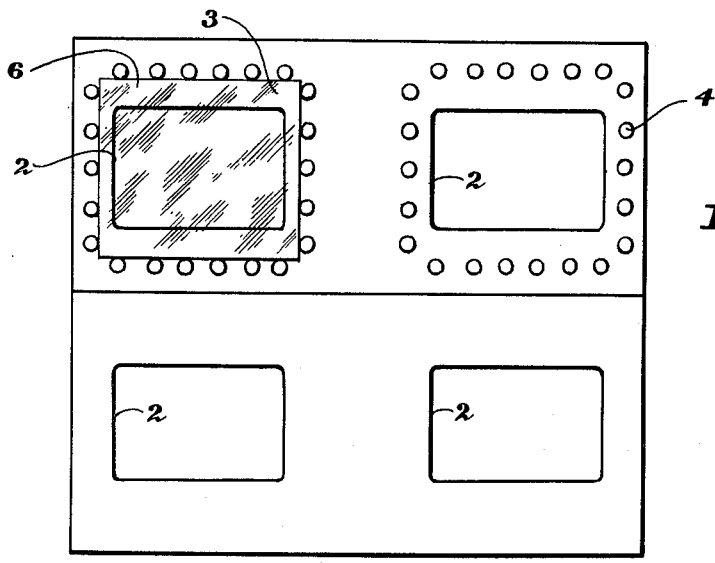

Feb. 22, 1966     J. HARPER ETAL     3,235,991

PAPER MOUNT FOR PHOTOGRAPHIC TRANSPARENCIES

Filed March 29, 1965

James Harper
Martin Salo
INVENTORS

BY R. Frank Smith
Ogden H. Webster
ATTORNEYS

United States Patent Office 3,235,991
Patented Feb. 22, 1966

3,235,991
PAPER MOUNT FOR PHOTOGRAPHIC
TRANSPARENCIES
James Harper and Martin Salo, Rochester, N.Y., assignors to Eastman Kodak Company, Rochester, N.Y., a corporation of New Jersey
Filed Mar. 29, 1965, Ser. No. 443,609
6 Claims. (Cl. 40—158)

This application is a continuation-in-part of Harper and Salo U.S. Serial No. 108,200, filed May 5, 1961, now abandoned.

This invention relates to mounts for photographic positives or transparencies for projection purposes, more particularly, to a method of making transparency mounts using a printable adhesive.

Transparency slides are customarily prepared from photographic film for projection purposes. These slides are necessarily inexpensive to manufacture and normally consist of a cardboard folder having apertures through which the light can pass and having an adhesive coated kraft paper insert approximately the same thickness as the photographic transparency which provides spacing and alignment for the transparency. This paper insert is adhesively attached during manufacture to the cardboard mount by rapid mounting equipment.

In order to further reduce the cost of the transparencies to the customer, it has been desirable to reduce the number of operations required to manufacture a mount for the film. This has been considered difficult to do, since the components of the paper transparency mount have all been considered essential in order to prepare a marketable mount in which the transparency was properly aligned and at the same time properly secured to the mount.

Certain other considerations have also been involved in preparing transparency mounts. In some instances, the transparency has been secured in a glass mount assembly to obviate buckling or popping of the transparency during projection. In the most common embodiment of the transparency mount, the transparency has been held in the mount mainly by means of the spacing and aligning kraft paper insert. This provides that the transparency itself could be easily removed from the mount in the event that the mount became damaged, worn or bent during the projection operation.

We have found a method of preparing transparency mounts which not only aligns and spaces the transparency in the mounts, but also simultaneously provides adhesive means. These transparency mounts can be prepared using printing methods without requiring a kraft paper insert.

One object of this invention is to provide an inexpensive paper mount for photographic transparencies. Another object is to provide an improved method of making photographic transparency mounts. An additional object is to provide a printable heat-sealing composition for use on photographic transparency mounts. An additional object is to provide spacing and aligning means in a transparency mount which also incorporate thermoplastic heat-sealing means.

These and other objects of our invention are accomplished by adherently securing to at least one frame member of a transparency mount a self-supporting mixture of adhesive and non-fibrous filler, the mixture being arranged around the aperture in the frame member in a raised, predetermined pattern to form a nest to non-adhesively receive and position a transparency over the aperture. The mixture of adhesive and non-fibrous filler employed in this invention is free from continuous fibrous material, non-blocking at ambient temperatures, and preferably non-compressible at heat sealing temperatures. Transparency mounts in accordance with this invention eliminate the adhesive coated kraft paper inserts employed in prior art transparency mounts, but nevertheless retain the function of non-adhesively positioning a transparency over the aperture in the mount prior to and during heat sealing to form the mounted transparency.

Figure 2:
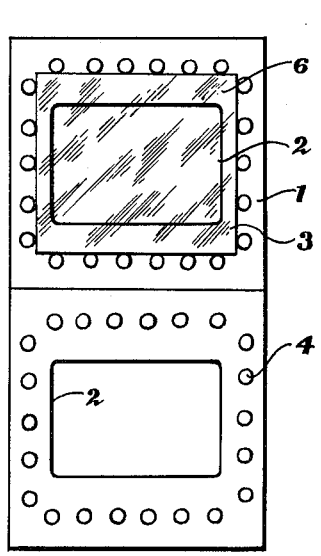
Figure 3:
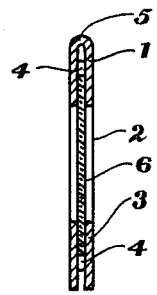
Figure 4:
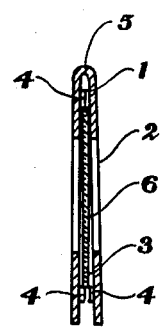

The drawing shows embodiments of our invention as follows:

FIG. 1 is a top plan view of a transparency mount for stereoscopic transparencies. FIG. 2 is a top plan view of a single frame transparency mount. FIG. 3 is a sectional view through the folded transparency mount shown in FIG. 1. FIG. 4 is a sectional view through the folded transparency mount shown in FIG. 2.

In all of the figures, transparency mount 1 may consist of a generally rectangular cardboard support having apertures 2 cut therein. These apertures are so spaced that when the mount is folded along a weakened line 5, the apertures 2 will be automatically registered to frame a transparency lying in a transparency seat 3. The transparency 6 is located in the seat by means of raised dots 4. The raised dots 4 act as both spacing and aligning means and also as adhesive means when heat is applied to the completed mounted transparency. Dielectric heating can be used for sealing this assembly.

The printable heat-sealing compositions are obtained by mixing 23–62 percent of an aqueous polyvinyl acetate latex containing 40–70 percent solids with 0.05–0.35 percent (of the total) of a water-soluble protective colloid added as a 1% aqueous solution to adjust flow properties and prevent settling. 0–15 percent (of the total) of a water and oil type emulsion of a highly halogenated naphthalene (Halowax 1014) added as a 44% solids latex may be added to control blocking in storage and heating characteristics when subjected to dielectric heating. 24–56 percent of a water-resistant, inert filler or extender is needed to control blocking and compressibility during heat-sealing. These may be such materials as calcium magnesium or aluminum silicate or mixtures thereof. For instance, talc, calcium carbonate, aluminum silicates, wood flour, vegetable flour, scrap mineral flour, Wollastonite or Feldspar may be used. A suitable fungicide may be desirable in order to prevent mold growth on storage. An amount of 50–500 parts per million may be used advantageously.

Hydrophilic protective colloids such as ethoxyethyl cellulose, carboxymethyl cellulose, methyl cellulose and hydroxyethyl cellulose are typical of those which may be used. Other materials may also be used such as the ammonium, sodium or potassium salts of cellulose phthalate, ethyl cellulose phthalate, polyvinyl phthalate, succinates, acrylates and the like.

The mixing methods used for compounding our formulations are simple. An ordinary propeller type mixer may be used for agitating the components in order to obtain satisfactory mixing. For instance, a Lightnin' Mixer or a Waring Blendor may be used. The mixtures may also be ball-milled to obtain blending of the components.

In our preferred embodiment the coatings were printed on the paper surface using plastic or metal stencils and by gravure methods. The following examples are intended to illustrate our invention but are not intended to limit it in any way.

EXAMPLE 1

The following table shows compositions which have been made, coated onto cardboard and found to be adherent, non-blocking, heat-sealable and non-compressible at 230–270° F. as a printable transparency-mount sealer.

*Printable ready-mount sealer compositions*

| Polyvinyl Acetate Latex 58% Solids | Carboxy-methyl[c] Cellulose (1% in Water) | Halogen-ated[d] Naphthalene, 44% Solids Aueous Emulsion | Filler Vermont Talc | Zinc Chromate | Brookfield Viscosity, c.p.s. | | |
|---|---|---|---|---|---|---|---|
| | | | | | Spindle # | R.p.m. | |
| | | | | | | 2 | 20 |
| 40[a] | 26 | 10 | 24 | 0.4 | 3 | 1,700 | 900 |
| 40[a] | 10 | 10 | 40 | 0.4 | 3 | 6,700 | 2,200 |
| 62[a] | 0 | 12 | 26 | 0.2 | 3 | 8,200 | 4,600 |
| 46[b] | 18 | 9 | 27 | 0.2 | 3 | 9,200 | 3,800 |
| 37[a] | 19 | 7 | 37 | 0.2 | 3 | 24,000 | 5,700 |
| 42 | 25 | 9 | Feldspar 24 | 0.2 | 5 | 19,500 | 6,000 |
| 24 | 25 | 9 | Wollastonite 42 | 0.2 | 5 | 7,500 | 3,400 |

[a] Contained 50 p.p.m., p-di-isobutyl-phenoxyethoxyethyl di-methyl benzyl ammonium chloride monohydrate.
[b] Contained 50 p.p.m., 25% sodium trichlorophenate, 25% sodium pentachlorophenate, 50% inert.
[c] Hercules high viscosity type 70.
[d] Halowax 1014.

All the above gave compositions which were flowable liquids of apparent viscosities in the range 900 to 24,000 c.p.s. as measured by a rotational type viscosimeter (Brookfield Synchroelectric). All showed appreciable thixotropy. These compositions can be coated to non-blocking layers with good heat sealing properties which are essentially non-compressible.

EXAMPLE 2.—HOT MELT APPLICATION

The following table shows compositions which have been made coated onto cardboard, and found to be adherent, non-blocking, heat sealable, and non-compressible at 230–270° F., as a printable transparency mount sealer.

| Percent Polyvinyl Acetate | Percent Talc | Percent Halowax 1014 | Melt Coating Behavior at 150-170° C. | Sealing Behavior (dielectric sealer) |
|---|---|---|---|---|
| [a]47.6 | 47.6 | 4.8 | good | good |
| [b]70.5 | 22.4 | 7.1 | good | good |

[a] Gelva V 1.5 made by Shawinigan.
[b] Gelva V 2.5 made by Shawinigan.

Operative ranges:                                        Percent
  Talc---------------------------------------------------- 5-50
  Halowax------------------------------------------------- 1-10
  Remainder, polyvinyl acetate.

The heat-sealable printable compositions of this invention may be colored if desired by the addition of suitable dyes or pigments. In the event that a hot melt coating is applied, the conventional gravure roll-type application may be used although other known methods for applying hot melt coatings may also be used with this coating composition.

In our preferred embodiment, the coating composition is printed in the form of raised dots to form the seat for the transparency. However, the particular pattern of the coating composition may be varied and may be applied to cover the complete area exclusive of the aperture and the seat itself. It may also be applied as a narrow strip or it may be applied in terms of strips diagonal to the seat position. In view of the thickness of the coating, it may be desirable to use some broken pattern which will avoid the possibility of curl from the adhesive composition.

The thickness of film transparencies is very often from 5 to 6 mils so that the spacing required is in the neighborhood of 6 mils. For this reason the coating can be applied on either one or both halves of the transparency mount so that the desirable thickness will be obtained. For instance, there may be a coating of 3-mil thickness on both halves so that the combined thickness would be 6 mils or we may apply the coating on only one side at a thickness of about 6 mils.

Although our preferred embodiments of this invention apply to photographic transparencies, it is intended to cover other mounting media where this type of mounting is desirable. For instance, it is within the scope of our invention to provide an X-ray film mount having apertures through which one can view the X-ray image.

The invention has been described in detail with particular reference to preferred embodiments thereof, but it will be understood that variations and modifications can be effected within thhe spirit and scope of the invention, as described hereinabove and as defined in the appended claims.

We claim:

1. In a mount for transparencies comprising two frame members each of which have light transmitting apertures, at least one of said frame members being provided with means to non-adhesively position a transparency over the aperture therein and to seal said frame members to one another in overlying relation so that the apertures thereof are in register with a transparency positioned between the frame members and covering the apertures, the improvement wherein the positioning and sealing means comprises a self-supporting mixture of adhesive and non-fibrous filler adherently secured to at least one frame member, said mixture being of sufficient thickness and arranged in a predetermined pattern about the aperture in said one frame member to form a nest to non-adhesively receive and position a transparency over the aperture in said one frame member, said mixture being free from continuous fibrous material, non-blocking at ambient temperatures and heat sealable to secure the two frame members to each other with a transparency secured therebetween and covering the apertures thereof.

2. In a mount for transparencies comprising two frame members each of which have light transmitting apertures, at least one of said frame members being provided with means to non-adhesively position a transparency over the aperture therein and to seal said frame members to one another in overlying relation so that the apertures thereof are in register with a transparency positioned between the frame members and covering the apertures, the improvement wherein the positioning and sealing means consists of a self-supporting mixture of adhesive and non-fibrous filler adherently secured to at least one frame member, said mixture being of sufficient thickness and arranged in a predetermined pattern about the aperture in said one frame member to form a nest to non-adhesively receive and position a transparency over the aperture in said one frame member, said mixture being free from continuous fibrous material, non-blocking at ambient temperatures, essentially non-compressible at heat-sealing temperatures, and heat sealable to secure the two frame members to each other with a transparency secured therebetween and covering the apertures thereof.

3. In a mount for transparencies comprising two frame members each of which have light transmitting apertures, at least one of said frame members being provided with means to non-adhesively position a transparency over the aperture therein and to seal said frame members to one another in overlying relation so that the apertures thereof are in register with a transparency positioned between the frame members and covering the apertures, the improvement wherein the positioning and sealing means consists of a self-supporting mixture of adhesive and non-fibrous filler adherently secured to at least one frame member, said mixture being of sufficient thickness and arranged in a predetermined pattern about the aperture in said one frame member to form a nest to non-adhesively receive and position a transparency over the aperture in said one frame member, said mixture consisting essentially of, by weight, 23–62% of an aqueous polyvinyl acetate latex containing from 40–70% solids, and 24–56% of a water-resistant, inert filler.

4. In a mount for transparencies comprising two frame members each of which have light transmitting apertures, at least one of said frame members being provided with means to non-adhesively position a transparency over the aperture therein and to seal said frame members to one another in overlying relation so that the apertures thereof are in register with a transparency positioned between the frame members and covering the apertures, the improvement wherein the positioning and sealing means consists of a self-supporting mixture of adhesive and non-fibrous filler adherently secured to at least one frame member, said mixture being of sufficient thickness and arranged in a predetermined pattern about the aperture in said one frame member to form a nest to non-adhesively receive and position a transparency over the aperture in said one frame member, said mixture consisting essentially of, by weight, 40 parts aqueous polyvinyl acetate latex containing approximately 58% solids; 26 parts of a 1% aqueous solution of carboxymethyl cellulose; 10 parts aqueous halogenated wax emulsion containing 44% solids and 24 parts talc.

5. In the process for preparing mounts for transparencies comprising two frame members each of which have light transmitting apertures, at least one of said frame members being provided with means to non-adhesively position a transparency over the aperture therein and to seal said frame members to one another in overlying relation so that the apertures thereof are in register with a transparency positioned between the frame members and covering the apertures, the improvement which comprises:

(a) forming a mixture of adhesive and non-fibrous filler, said mixture being free from continuous fibrous material, non-blocking at ambient temperatures and heat sealable; and (b) adherently securing said mixture to at least one frame member in sufficient thickness and in a predetermined pattern about the aperture in said one frame member to form a nest to non-adhesively receive and position a transparency over the aperture in said one frame member.

6. In the process for preparing mounts for transparencies comprising two frame members each of which have light transmitting apertures, at least one of said frame members being provided with means to non-adhesively position a transparency over the aperture therein and to seal said frame members to one another in overlying relation so that the apertures thereof are in register with a transparency position between the frame members and covering the apertures, the improvement which comprises:

(a) forming a mixture consisting essentially of, by weight, 23–62% of an aqueous polyvinyl acetate latex containing from 40–70% solids and 24–56% of a water-resistant, inert filler; and (b) adherently securing said mixture to at least one frame member in sufficient thickness and in a predetermined pattern about the aperture in said one frame member to form a nest to non-adhesively receive and position a transparency over the aperture in said one frame member.

References Cited by the Examiner

UNITED STATES PATENTS

| | | | |
|---|---|---|---|
| 2,184,007 | 12/1939 | Staehle | 40—158 |
| 2,571,764 | 10/1951 | Rodger et al. | 40—158 |
| 2,832,163 | 4/1958 | Jost | 40—158 |
| 3,077,688 | 2/1963 | Friedman et al. | 40—158 |

EUGENE R. CAPOZIO, *Primary Examiner.*